H. WEIBEZAHL.
SAFETY DEVICE FOR PLATEN PRESSES.
APPLICATION FILED JAN. 31, 1920.
1,410,433.
Patented Mar. 21, 1922.
2 SHEETS—SHEET 1.
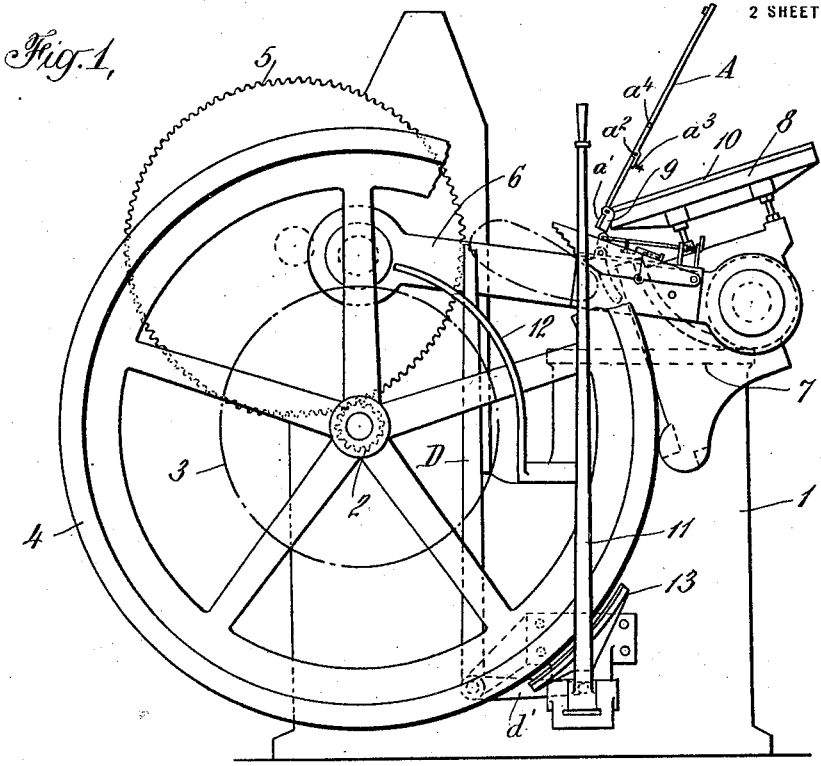
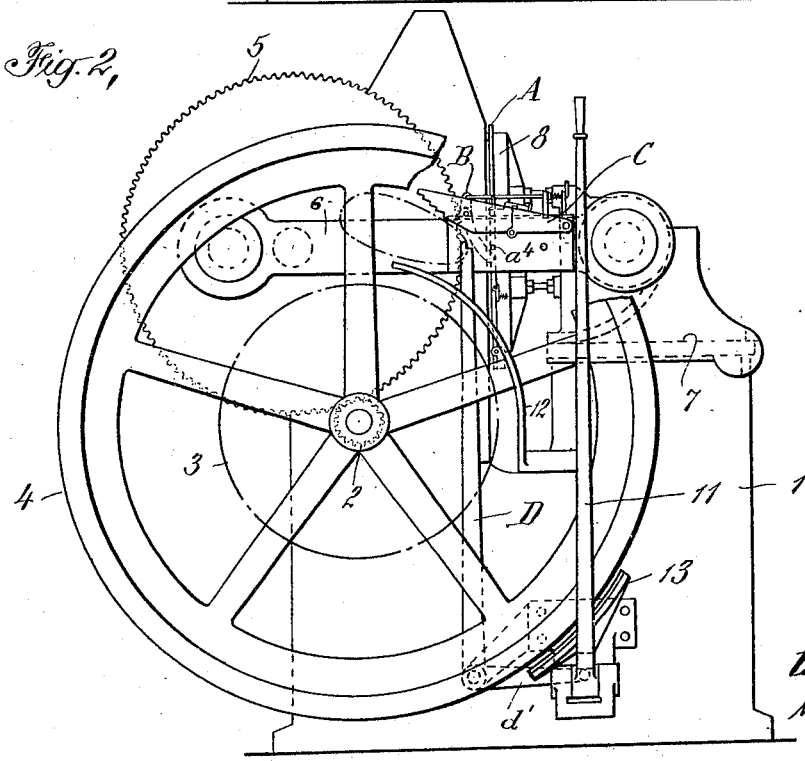
HERMAN WEIBEZAHL
Inventor
BY HIS ATTORNEYS

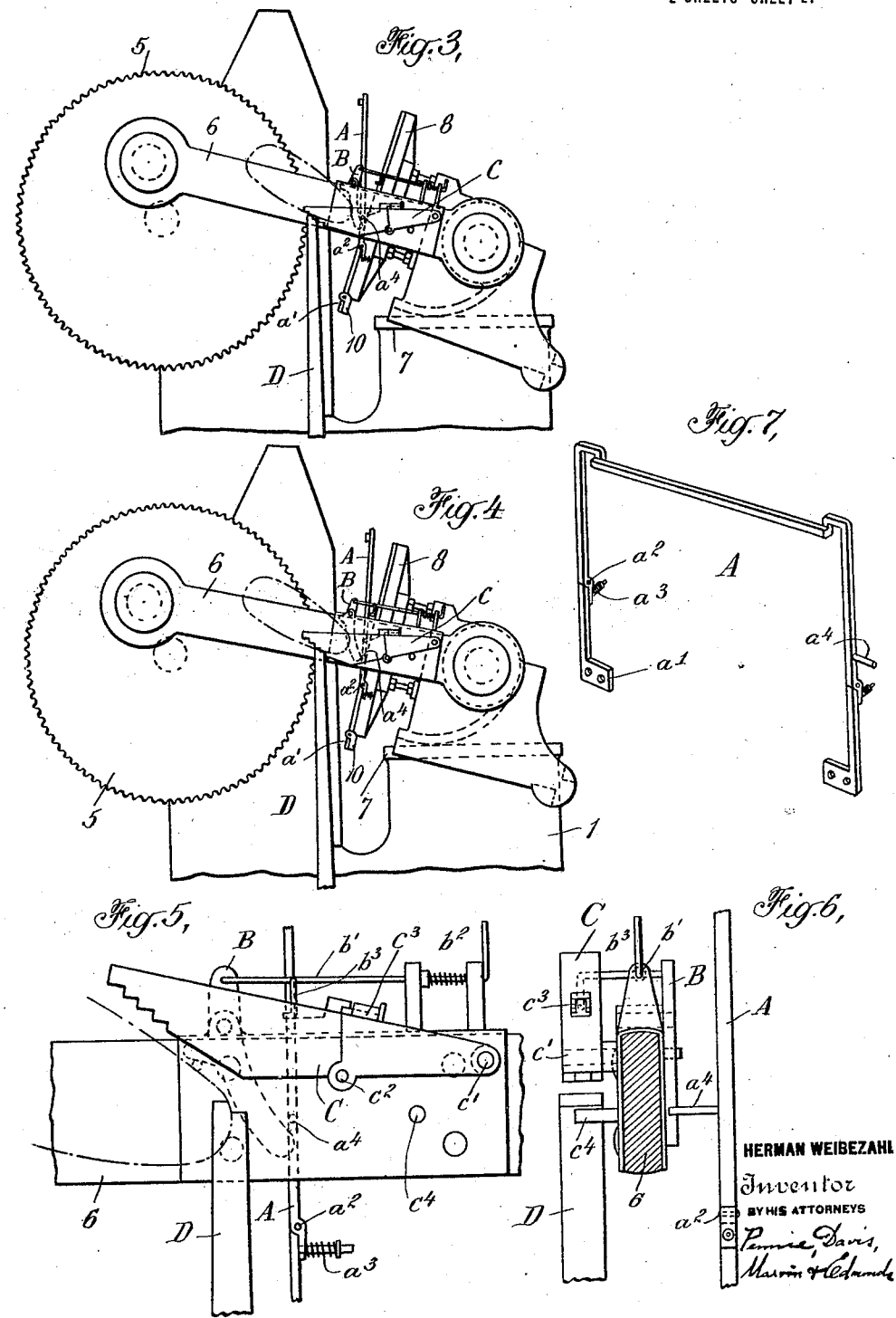

UNITED STATES PATENT OFFICE.

HERMAN WEIBEZAHL, OF ORANGE, NEW JERSEY.

SAFETY DEVICE FOR PLATEN PRESSES.

1,410,433. Specification of Letters Patent. Patented Mar. 21, 1922.

Application filed January 31, 1920. Serial No. 355,490.

*To all whom it may concern:*

Be it known that I, HERMAN WEIBEZAHL, a citizen of the United States, residing at Orange, in the county of Essex, State of New Jersey, have invented certain new and useful Improvements in Safety Devices for Platen Presses; and I do hereby declare the following to be a full, clear, and exact description of the invention, such as will enable others skilled in the art to which it appertains to make and use the same.

This invention relates to safety devices particularly adapted for the American style of platen printing presses.

The object of my invention is to provide a safety device for platen presses which shall prevent the closing of the press when the feeder's hand or fingers remain between the platen and the bed, which device, at the same time, shall not cause any interference with the feeding of the press, nor reduce its output, nor increase the spoilage, as is the case in the use of other "safety devices" now being put upon the market, for want of a proper safety guard.

I am well aware that a safety device partially accomplishing the result sought by me has been in commercial use for a number of years, on one type of the Victoria presses, which are manufactured in Germany, but that device is designed for that particular press solely, and is inapplicable to the presses built in this country. The Victoria press is operated by a friction clutch movement which disengages the press itself from the drive pulley, which, with the balance wheel, remains in motion when the press is thus disconnected, whereas the American presses are driven directly by the shaft carrying the drive pulley and balance wheel, so that, unless the brake be applied, the press will, of its own momentum, close and open several times, upon pulling the switch, carrying the motor around with it. It is necessary, therefore, in this type of presses, not only to shut off the power, but to stop the flywheel from revolving and to check the momentum of the press itself which, even if the flywheel were disengaged, would be sufficient to injure the feeder's hand, if caught upon the platen.

The Victoria device, has, however some grave objections. The guard frame recedes below the level of the platen, being recessed therein, and the working mechanism of the device is in use at all times, hence subject to wear. Furthermore, it is liable to not work if only the fingers are caught by the frame, but even if it does not fail to work, the frame, being made in one piece and fastened to the gripper bar, is able to deliver a painful blow, and catch the fingers as in a shear and prevent their withdrawal without pain or injury.

The other safety devices referred to above consist of a slidingly-extensible frame carried on the bridge of the press, and which, actuated by rods coming in contact with the connecting links, rises above the platen, as the press is closing, the object being to raise the hand out of danger. It will readily be seen, therefore, that, except in the beginning of the closing movement of the press, there is an obstacle presented to the proper adjustment of the sheet to the guides, which increases in geometrical proportion as the press closes, with the result that, unless the sheet be fed to its proper position before the platen has risen, it is necessary to bend the arm over this ever-increasing obstacle to give the sheet its final adjustment and, unless the hand be removed in time, it is forced by the safety frame against the form rollers. Several devices of this order have come upon the market for some years past, but were discarded, and their manufacture abandoned.

Subsequently new devices on the same order were brought out, and, for want of a better device, came into use. It was found, however, that accidents resulted by reason of the feeders putting their hands under the frame on the opening movement. A curtain was therefore added to the latest of the devices. This curtain cuts off his vision, so that the feeder must rely upon his sense of feeling to know whether the sheet has been properly fed against the guides, or trip the press—unless he has seen the sheet in its proper position before the curtain has cut off his vision. The result is, naturally, the time of adjustment of the sheet being so largely reduced, a very much curtailed output, and a very largely increased output of improperly fed sheets, since too great a movement of the hand is required to reach the throw-off bar, owing to the increased bend of the hand by reason of the safety device. The larger the press, the greater, naturally, the difficulties and dangers of these devices. To run a press at half speed without such a device would be safer and far more profitable in quantity and quality of output.

The present invention provides a safety guard, particularly adapted to the American type of platen presses, which possesses all the advantages of the Victoria device and eliminates the disadvantages of the latter. In accordance with the invention, the safety device is so constructed that the press will be automatically stopped in case the arm, hand or fingers of a feeder remain upon the platen for too long a time. The momentum of the press is utilized to cause it to stop by expending its force upon a brake. The arrangement is such that the press will be stopped at various points near the limit of its closing movement, so that if an arm, hand, or finger remains under the safety frame there will be a different stopping point for each of these members, in order that they will not be caught between the platen and the bed of the press. The parts of the safety device that are associated with the platen are so constructed as not to interfere with the feeding of sheets to the press, nor prevent overhanging sheets from being fed.

A further object of the invention is to eliminate the danger of injury to the hand or arm of a feeder by a blow delivered by the guard frame, for in the Victoria device the guard frame has been made rigid with the gripper bar, and, although regulated by a spring, it may deliver a stinging blow, particularly when the presses are running at high speed, and the frame may even hold the hand or arm in such a manner as to prevent its withdrawal without injury even though the frame were made to lie flat upon the platen.

The apparatus of the present invention is also constructed so that it will not function to stop the press if the hand or arm be withdrawn in time, or if the safety guard merely strikes one of these members. In other words, the safety device is so constructed that its parts will work only in case they are made effective by the guard frame. This prevents wear on a part which, after perhaps years of useless movement, might be called upon to perform a function which, in its worn condition, it might be unable to do by reason of wear upon the part, due to continual movement.

While the apparatus in intended primarily for stopping the press in case the hand or arm of an operator is not removed in time from the platen, the invention also provides an independent, manually operable, means by which the press may be stopped in case of accidents to its mechanism, such as the breaking of the roller carriage, the falling of a form, or the jumping out of a quoin. In the case of such accidents, the press is usually seriously damaged, and expensive repairs are necessary. As ordinarily contructed, the press cannot be stopped quickly enough to prevent injury, as it requires not only a setting of the brake, and a pulling of the switch, in case of motor drive, but a rare presence of mind combined with great strength, to stop the press in so short a space of time. In accordance with the present invention, it is only necessary to dislodge, by means of a handle, a suspended weight, and this can be accomplished by a mere touch with a finger.

The particular nature of the invention, as well as other objects and advantages thereof, will appear more clearly from a description of a preferred embodiment, as shown in the accompanying drawings, in which, for the purpose of illustration, I have shown the embodiments of my invention as applied to a Universal press, though, with slight modifications, it can be applied to any other style of press.

One of such modifications consists, in the case of presses having no recesses alongside of the ear carrying the gripper bar for the safety frame to lie in, in mounting a safety frame between the frame of the press and the connecting links and having it normally stationary in a position in front of the form rollers when in their extreme elevation, and in such a position with respect to the platen that the latter will freely pass under the frame but close enough so that the frame will be displaced, if the feeder's hand be not withdrawn, when the point of danger has been reached, the braking mechanism being set in motion by such movement of the frame.

In the drawings, Fig. 1 shows a press in the open position, with the safety device at normal. In Fig. 2, the press is shown in closed position. Figs. 3 and 4 show the position of the parts near the termination of the closing movement, with the safety device in action, the flywheel, brake and other parts being omitted to avoid confusion. Fig. 5 is an enlarged detail view of the parts of the device in their normal position. Fig. 6 is an end view of the device, the connecting link upon which it is mounted being shown in section. Fig. 7 is a detail view of the safety frame.

Similar reference marks refer to similar parts throughout the several views. I have designated the parts of the press by numerals, and have used letters for the parts which go to make up my device. In the platen printing press illustrated somewhat diagrammatically 1 is the frame, 2 the drive gear, 3 the pulley, 4 the flywheel, 5 the gear wheel, 6 the connecting links, 7 the bridge, 8 the platen, 9 the gripper bar, 10 the bale hoops, and 11 the brake lever provided with a belt shifter 12 and arranged to control a brake shoe 13.

In accordance with this invention I mount upon the gripper bar my safety frame A, by means of the lugs $a^1$. The frame is hinged at $a^2$, the hinges being so constructed that only a forward movement of the hinged portion is possible. The frame is held in normal position by the springs $a^3$. It carries a spur $a^4$ on one side, a little above the hinge. Its lugs $a^1$ are bolted to the gripper bar, and the side members lie, when the press is closed, between the lower bale hoop and the ears by which the gripper bar is held, and no part comes into contact with the carriage ways. Thus, the frame lies level with the platen, except its upper bar, which lies upon it.

As the press is in motion, and nearing the closing movement, the spur, in passing the connecting link, travels slopingly downward to about the lower line of the link, and ascends slopingly upward, the lines resembling the letter V. A short distance back of the upward stroke, I mount my trip B. The outline of its working face is similar to the path over which the spur moves. To the trip, I connect a release bar $b^1$, provided with an upwardly-bent handle. A spring $b^2$ holds the trip in normal position. Connected to the release bar by a hook $b^3$ is a stop C, which is held in normal position until released by the movement of the trip B. This stop is mounted on the outside of the connecting link by a bolt $C^1$, and consists of two parts hinged together at $C^2$ and held in alinement by a latch $C^3$. The outer part of the stop is provided at its end with a number of steps. When the stop is released by the movement of the trip, it falls of its own weight into position to allow one of the steps to engage with the brake lever D, according to the position of the press at the time, and is carried over with the brake lever until the shoe has brought the press to a stop. I provide a rest $C^4$ for the stop so that, in case it be disengaged before the upper step is in a position to engage the brake lever, it will be held so that engagement with it will be effected at the proper time. One or more steps may be added to the stop so that the press can be stopped by a mere touch of the release bar $b^1$, without closing entirely, when the press is beyond a point where there is any danger to the feeder, but where it might be necessary to stop it if any accident should happen to the form, form rollers, or for any other reason it should be desirable to stop the press before closing.

The brake lever D is attached to the press on the arm carrying the brake lever 11. It has an arm $d^1$ extending under the brake-shoe 13, which it will set when the brake lever 11 is thrown back by the stop. The form of press shown herein is arranged to be driven by a belt under the control of the shifter 12 on the brake lever 11, but the press may be driven by an electric motor provided with a switch arranged to be actuated by the brake lever 11 so that it may be controlled by the brake lever D.

In the operation of my device the safety frame A, being attached to the gripper bar, moves in unison with it and the grippers, passing the trip without interference except when, by the interposition of an object between the frame and the platen, the hinged portion is forced forward. In that case the spur $a^4$, coming in contact with the trip B, will tip the latter and disengage the hook $b^3$ from the stop C so that the latter will fall into position to engage the brake lever D, and stop the press. The trip, being set a short distance away from the line described by the spur, will not be set off by the frame merely striking the hand, but is forced back into position by the action of the spring on the release bar.

I have shown in Figs. 1 and 5 an elliptical course which represents the line described by the brake lever 11 in relation to the moving connecting link, the lower line representing the closing movement of the press. It will be seen that there is no interference by the lever with the stop when same is in normal position but when released by the trip, the stop will fall into position to engage the brake lever, the particular step coming into engagement being determined by the position of the press at the time of the setting off of the safety device. Thus, if a thick object, like the arm, be interposed between the safety frame and the platen, the frame will occupy a position such as is shown in Fig. 3 in which case the spur will engage the trip at an earlier part of the stroke than it would if a thinner object, such as a finger, be interposed between the safety frame and the platen, in which case the parts occupy a position such as is shown in Fig. 4. In either event the stop C will be released, but in the first case the stop will fall so that its upper step will engage the brake lever D as shown in Fig. 3, while in the second case the stop will fall so that its lowest step will engage the brake lever as shown in Fig. 4. It must be evident that, when so engaged, the connecting link will act to set the brake lever with the power of the momentum of the press, this being checked, however, as soon as the brake-shoe begins to operate, and all the momentum is expended then upon the brake to bring the machine quickly to rest.

To release the press, the stop may be broken by means of the latch $c^3$ carried thereon. It may then be released from the brake lever D and restored to normal condition by being attached to the hook $b^3$ on the release bar.

I have shown in the illustrations the parts mounted upon the connecting link carried on a casing upon same. They may, however, be mounted directly upon the link. Other modifications may be made without departing from the principle of the invention as defined in the appended claims.

I claim:

1. A safety frame for platen printing presses comprising side members adapted to lie adjacent to the sides of the platen and not extend above the face thereof and a top member adapted to lie upon the face of the platen at the upper edge thereof.

2. A safety frame for platen printing presses comprising side members adapted to lie adjacent to the sides of the platen and not extend above the face thereof which side members carry hinged joints movable in only one direction, and a top member adapted to lie upon the face of the platen at the upper edge thereof.

3. In a gear-driven platen printing press, the combination of a safety frame and braking mechanism engageable through displacement of the frame, adapted to automatically stop the press when the frame is prevented from occupying its normal position.

4. In a platen printing press, the combination of a safety frame, a fly wheel and braking mechanism engageable with it through displacement of said frame, adapted to stop the press before the completion of the closing movement.

5. In a gear-driven platen printing press, the combination of a safety frame, a tripping device and braking mechanism adapted to be brought into operation through said tripping device for automatically stopping the press when said frame is prevented from occupying its normal position with relation to the platen.

6. In a platen printing press, a fly wheel, braking mechanism acting on the fly wheel, a safety frame and means adapted for operatively connecting the safety frame and the braking mechanism when the said frame is forced out of normal position.

7. In a platen printing press, a safety frame, a brake, and brake actuating mechanism, the safety frame when forced out of normal position being adapted to operatively connect the brake actuating mechanism with moving parts of the press for applying a progressive braking action.

8. In a gear-driven platen printing press, the combination of a safety frame, a brake, and means associated with the safety frame adapted to automatically set the brake to stop the press when the safety frame assumes an abnormal position.

9. In a gear-driven platen printing press, the combination of a safety frame, and means under the control of the safety frame adapted to cause the momentum of the press to be expended in stopping the same when the safety frame is prevented from becoming normally seated.

10. In a gear-driven platen printing press, the combination of a safety frame, a brake, and means under the control of the safety frame adapted to cause the momentum of the press to be expended in applying the brake to the moving parts of the press when the safety frame is prevented from becoming normally seated.

11. In a gear-driven platen printing press the combination of a safety frame adapted normally to occupy such a relation to the platen that it does not interfere with the feeding of sheets thereto, and means associated with the safety frame adapted to automatically stop the press when the safety frame occupies an abnormal position with respect to the platen.

12. In a platen printing press, the combination of a safety frame associated with the platen and adapted to be displaced by the presence of an object between the platen and the frame, other than the sheet being fed, and means under the control of the frame adapted to automatically stop the press at a point in the closing movement of the platen, depending upon the amount of displacement of the frame caused by said object between it and the platen.

13. In a gear-driven platen printing press, the combination of a safety frame adapted normally to remain inactive, and means associated with said safety frame for automatically stopping the press if the safety frame is prevented from occupying its normal position when the platen reaches a predetermined point in its closing movement, said means comprising a trip adapted to be brought into action through displacement of said frame and braking mechanism prevented from functioning until actuated by said trip.

14. In a gear-driven platen printing press the combination of a safety frame, an auxiliary emergency brake lever, means for actuating the brake lever by movement of the press, and means under the control of the safety frame adapted to cause the brake lever actuating means to become effective when the safety frame is prevented from becoming normally seated.

15. In a gear-driven platen printing press, the combination of a brake, an auxiliary lever for controlling the brake, means for actuating the lever, means associated with the platen for controlling the brake lever actuating means adapted to automatically apply the brake, and means whereby the brake lever actuating means may be controlled manually to apply the brake.

16. In a platen printing press the combination of a safety frame comprising a lower portion and an upper portion hinged to each other, a spur mounted upon one of said portions, and a trip controlling a braking mechanism adapted to be brought into action through the release of said trip, all coacting for automatically stopping the press when the upper portion is displaced with respect to the lower portion.

17. In a platen printing press, the combination of a safety frame composed of jointedly connected portions adapted normally to be seated upon the platen, braking mechanism for the press, and means associated with one of the portions of the frame adapted to actuate the braking mechanism when said portion is displaced from its normal position by the presence of an obstruction between it and the platen.

18. In a platen printing press the combination of a safety frame composed of two portions pivotally connected to each other, means for normally holding the two portions in the same plane, braking mechanism for the press, and means associated with one of the portions of the frame adapted to actuate the braking mechanism when said portion is displaced from the plane of the other portion by an obstruction between it and the platen.

19. In a platen printing press the combination of braking mechanism for the moving parts of the press, means for controlling the braking mechanism, and a normally inactive safety device associated with the platen and adapted to be placed in operative relation to the braking mechanism controlling means by the presence of an obstruction between it and the platen of the press.

20. In a printing press having a rocking platen, a connecting link attached to the platen and rotary driving means for moving the connecting link, the combination of a safety frame associated with the platen, a tripping member and a stopping member, each mounted upon the connecting link, a brake associated with the driving means of the press, a lever for controlling the brake, means associated with the tripping member for holding the stopping member in position to clear the brake lever during the normal operation of the press, and means associated with the safety frame adapted to actuate the tripping member to release the stopping member, so that it may engage the lever to apply the brake when the frame assumes an abnormal position, due to the presence of an obstruction between said frame and the platen.

21. In a printing press having a rocking platen, a connecting link attached to the platen and rotary driving means for moving the connecting link, the combination of a safety frame associated with the platen and composed of a lower portion and an upper portion jointedly attached to each other, a tripping member and a stopping member, each pivotally mounted upon the connecting link, a brake associated with the driving means of the press, a lever for controlling the brake, means associated with the tripping member for holding the stopping member in position to clear the brake lever during the normal operation of the machine, and means associated with the upper portion of the frame adapted, when said portion assumes an abnormal position, to engage the tripping member to release the stopping member so that it may fall into engagement with the brake lever to actuate the latter and apply the brake.

22. In a printing press having a rocking platen, a connecting link attached to the platen and rotary driving means for moving the connecting link, the combination of a safety frame associated with the platen, a brake associated with the driving means of the press, a lever for controlling the brake, a trip mounted on the connecting link, a stop composed of two parts hinged together one of said parts being pivoted to the connecting link and the other part being provided with steps at its outer end, a latch for holding the parts in alinement, means associated with the trip and detachably connected to the step part of the stop for normally holding the stop in such position that it will not engage the brake lever during the operation of the press, and means associated with the safety frame adapted to engage the trip when the frame is prevented from occupying its normal position with respect to the platen to release the stop and permit its stepped end to engage the end of the brake lever to apply the brake and stop the machine.

23. A safety device for a gear driven platen press, comprising braking mechanism adapted to be engaged by moving parts of the press so that the inertia of these moving parts causes the braking mechanism to operate, and a manually operated trip for throwing the braking mechanism into operative engagement with said moving parts of the press.

24. A safety device for a gear driven platen press, comprising braking mechanism adapted to be engaged by moving parts of the press, so that the inertia of these parts causes the braking mechanism to operate, a safety frame adapted to be normally seated on the platen for automatically throwing in the braking mechanism when prevented from assuming its normal seating position, and a manually operated trip for also throwing the braking mechanism into operative engagement with the moving parts of the press.

In testimony whereof I affix my signature.

HERMAN WEIBEZAHL.